United States Patent
Banerjee et al.

(10) Patent No.: US 11,902,390 B2
(45) Date of Patent: Feb. 13, 2024

(54) METHOD, SYSTEM AND NETWORK NODES FOR ENHANCING SERVICE PROVISION IN A NETWORK COMPRISING A PLURALITY OF COMPUTING DEVICE NODES

(71) Applicant: Telefonaktiebolaget LM Ericsson (publ), Stockholm (SE)

(72) Inventors: Arindam Banerjee, Howrah (IN); Saravanan M, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/790,982

(22) PCT Filed: Jan. 17, 2020

(86) PCT No.: PCT/EP2020/051116
§ 371 (c)(1),
(2) Date: Jul. 6, 2022

(87) PCT Pub. No.: WO2021/144030
PCT Pub. Date: Jul. 22, 2021

(65) Prior Publication Data
US 2023/0047108 A1 Feb. 16, 2023

(51) Int. Cl.
*H04L 67/51* (2022.01)
*H04L 41/0893* (2022.01)
(Continued)

(52) U.S. Cl.
CPC .......... *H04L 67/51* (2022.05); *H04L 41/0806* (2013.01); *H04L 41/0893* (2013.01); *H04L 41/142* (2013.01); *H04L 41/16* (2013.01)

(58) Field of Classification Search
CPC . H04L 67/51; H04L 41/0806; H04L 41/0893; H04L 41/142; H04L 41/16
See application file for complete search history.

(56) References Cited

U.S. PATENT DOCUMENTS 6,260,190 B1 * 7/2001 Ju ........................... G06F 8/445
712/205
11,184,402 B2 * 11/2021 Kundu ................... G06N 3/045
(Continued)

OTHER PUBLICATIONS

International Search Report and Written Opinion of the International Searching Authority for PCT International Application No. PCT/EP2020/051116 dated Oct. 9, 2020.
(Continued)

*Primary Examiner* — Lance Leonard Barry
(74) *Attorney, Agent, or Firm* — Sage Patent Group

(57) ABSTRACT

A method obtains service request information identifying computing device nodes invoked by users. Based on the service request information, sets of computing device nodes are identified, each set of computing device nodes includes computing device nodes invoked simultaneously or sequentially by one of the users. Communities are further identified based on a probability measure that is a measure of a probability of co-occurrence of two sets of computing device nodes. Each community has sets of computing device nodes each having the probability measure over a probability threshold in relation to at least one other set of computing device nodes in the community. Solutions are predicted for provision of services of the sets of computing device nodes of the communities. Each predicted solution for provision of services relates to a community and is determined based on shared knowledge of predicted solutions for provision of services relating to other communities.

13 Claims, 5 Drawing Sheets

(51) Int. Cl.
*H04L 41/142* (2022.01)
*H04L 41/0806* (2022.01)
*H04L 41/16* (2022.01)

(56) References Cited

U.S. PATENT DOCUMENTS

2016/0205204 A1    7/2016  Fersman et al.
2018/0212996 A1*  7/2018  Nedeltchev .............. G06N 7/01
2021/0374610 A1*  12/2021  Dirac .................... G06N 20/00

OTHER PUBLICATIONS

Gonzalez et al., "Understanding individual human mobility patterns," Nature, vol. 453, Jun. 2008, pp. 779-782.
Song et al., "Limits of Predictability in Human Mobility," Science, vol. 327, Feb. 2010, pp. 1018-1021.

* cited by examiner

METHOD, SYSTEM AND NETWORK NODES FOR ENHANCING SERVICE PROVISION IN A NETWORK COMPRISING A PLURALITY OF COMPUTING DEVICE NODES

CROSS REFERENCE TO RELATED APPLICATION

This application is a 35 U.S.C. § 371 national stage application of PCT International Application No. PCT/EP2020/051116 filed on Jan. 17, 2020, the disclosure and content of which is incorporated by reference herein in its entirety.

TECHNICAL FIELD

The present disclosure pertains to the field of communication systems. More particularly, the present disclosure pertains to a method, system and network nodes for enhancing service provision in a network comprising a plurality of fog service nodes.

BACKGROUND

With the expansion of connected devices, our businesses and personal lives are transforming to new directions. One more transformation can be expected in cities and communities with the establishment of Smart Cities with the support e.g. of Tactile Internet. The Tactile Internet would be the next evolution of the Internet of Things (IoT), encompassing human-to-machine and machine-to-machine interaction.

An increased number of intelligent and connected devices will be required together with an increased number of local service nodes. This in turn will increases requirements for local computational resources. Content and data may be transmitted over a 5G network, while intelligence may be enabled close to the user experience through mobile edge computing using edge or fog nodes for local computational resources.

Even with increased amount of local computational resources, problems may arise in meeting future requirements of extremely low latency in combination with high availability, reliability and security.

SUMMARY

An object is to provide a method, a control unit and network node which seek to mitigate, alleviate, or eliminate one or more deficiencies in the art.

This object is obtained by a method, a system and network nodes for enhancing service provision in a network comprising a plurality of computing device nodes.

According to a first aspect, a method is provided for enhancing service provision in a network comprising a plurality of computing device nodes for providing services to a plurality of users. The method comprises obtaining service request information identifying computing device nodes invoked by the plurality of users. Based on the service request information, a plurality of sets of computing device nodes is identified, each set of computing device nodes comprising computing device nodes invoked simultaneously or sequentially by one of the plurality of users. Communities are then identified based on a probability measure that is a measure of a probability of co-occurrence of two sets of computing device nodes. Each community consisting of sets of computing device nodes each having the probability measure over a probability threshold in relation to at least one other set of computing device nodes in the community. Solutions for provision of services of the sets of computing device nodes of the communities are then predicted. Each predicted solution for provision of services relates to a community and is determined based on shared knowledge of predicted solutions for provision of services relating to other communities. The predicted solutions for provision of services are then transferred to the sets of computing device nodes of the communities.

In embodiments, the method further comprises calculating an entropy measure based on a distribution of frequencies of invoking the sets of computing device nodes. The entropy measure is higher if the frequencies are unevenly distributed and lower if the frequencies are evenly distributed. A pattern change predictor is then calculated as a rate of change of the entropy measure, and a pattern change is identified on condition that the pattern change predictor is over a rate threshold.

In embodiments, the solutions for provision of services are predicted on condition that a pattern change is identified.

In embodiments, the method further comprises calculating distance measures between communities, each distance measure being inversely dependent of a number of cross community service requests and the total number of users participating in cross provisional community service requests. Communities with a distance measure below a distance threshold are merged, and community merging information are stored identifying merged communities for use in cross community service invocation.

In embodiments, the method further comprises providing, to at least one user of the plurality of users, services of at least one set of computing device nodes of the communities according to the predicted solutions for provision of services.

According to a second aspect, a system is provided for enhancing service provision in a network comprising a plurality of computing device nodes for providing services to a plurality of users. The system is adapted to obtain service request information identifying computing device nodes invoked by the plurality of users. Based on the service request information, a plurality of sets of computing device nodes is identified. Each set of computing device nodes comprising computing device nodes invoked simultaneously or sequentially by one of the plurality of users. Communities are then identified based on a probability measure that is a measure of a probability of co-occurrence of two sets of computing device nodes. Each community consisting of sets of computing device nodes each having the probability measure over a probability threshold in relation to at least one other set of computing device nodes in the community. Solutions for provision of services of the sets of computing device nodes of the communities are then predicted. Each predicted solution for provision of services relating to a community and being determined based on shared knowledge of predicted solutions for provision of services relating to other communities. The predicted solutions for provision of services are then transferred to the sets of computing device nodes of the communities.

In embodiments, the system is further adapted to calculate an entropy measure based on a distribution of frequencies of invoking the sets of computing device nodes. The entropy measure is higher if the frequencies are unevenly distributed and lower if the frequencies are evenly distributed. A pattern change predictor is then calculated as a rate of change of the entropy measure, and a pattern change is identified on condition that the pattern change predictor is over a rate threshold.

In embodiments, the solutions for provision of services are predicted on condition that a pattern change is identified.

In embodiments, the system is further adapted to calculate distance measures between communities. Each distance measure being inversely dependent of a number of cross community service requests and the total number of users participating in cross provisional community service requests. Communities with a distance measure below a distance threshold are merged, and community merging information are stored identifying merged communities for use in cross community service invocation.

In embodiments, the system is further adapted to provide, to at least one user of the plurality of users, services of at least one set of computing device nodes of the communities according to the predicted solutions for provision of services.

According to a third aspect, a network node is provided for enhancing service provision in a network comprising a plurality of computing device nodes for providing services to a plurality of users. The network node comprises processing circuitry, and a memory, said memory containing instructions executable by said processing circuitry, whereby the network node is operative to identify, based on service request information identifying computing device nodes invoked by the plurality of users, a plurality of sets of computing device nodes. Each set of computing device nodes comprising computing device nodes invoked simultaneously or sequentially by one of the plurality of users. The network node is further operative to identify communities based on a probability measure that is a measure of a probability of co-occurrence of two sets of computing device nodes. Each community consists of sets of computing device nodes each having the probability measure over a probability threshold in relation to at least one other set of computing device nodes in the community. The network node is further operative to receive predicted solutions for provision of services of the sets of computing device nodes of the communities. Each received predicted solution for provision of services relates to a community and is determined based on shared knowledge of predicted solutions for provision of services relating to other communities. The network node is further operative to transfer the predicted solutions for provision of services to the sets of computing device nodes of the communities.

In embodiments, the network node of the third aspect is further operative to calculate an entropy measure based on a distribution of frequencies of invoking the sets of computing device nodes. The entropy measure is higher if the frequencies are unevenly distributed and lower if the frequencies are evenly distributed. The network node is further operative to calculate a pattern change predictor as a rate of change of the entropy measure, and identify a pattern change on condition that the pattern change predictor is over a rate threshold.

In embodiments, the predicted solutions for provision of services are received on condition that a pattern change is identified.

According to a fourth aspect, a network node is provided for enhancing service provision in a network comprising a plurality of computing device nodes for providing services to a plurality of users. The network node comprises processing circuitry, and a memory, said memory containing instructions executable by said processing circuitry, whereby said network node is operative to obtaining identification of a plurality of sets of computing device nodes. Each set of computing device nodes comprising computing device nodes invoked simultaneously or sequentially by at least one of the plurality of users. The network node is further operative to obtain identification of communities. Each community consists of sets of computing device nodes each having a probability measure over a probability threshold in relation to at least one other set of computing device nodes in the community. The probability measure is a measure of a probability of co-occurrence of two sets of computing device nodes. The network node is further operative to predict a solution for provision of services of the sets of computing device nodes of a community to which the network node is associated. The predicted solution for provision of services is determined based on shared knowledge of predicted solutions for provision of services relating to other communities. The network node is further operative to transfer the predicted solution for provision of services to the sets of computing device nodes of the community to which the network node is associated.

In embodiments, the network node of the fourth aspect is further operative to transfer the predicted solution for provision of services relating to the community to which the network node is associated with for sharing with other communities.

According to a fifth aspect, a computer program is provided, comprising instructions which, when executed by processing circuitry, cause the processing circuitry to perform the methods according to the first aspect.

Embodiments of the computer program according to the fifth aspect may for example include features corresponding to the features of any of the embodiments of the method according to the first aspect.

According to a sixth aspect, a computer program product is provided having stored thereon a computer program comprising instructions which, when executed by processing circuitry, cause the processing circuitry to perform the methods according to the first aspect.

Embodiments of the computer program product according to the sixth aspect may for example include features corresponding to the features of any of the embodiments of the method according to the first aspect.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
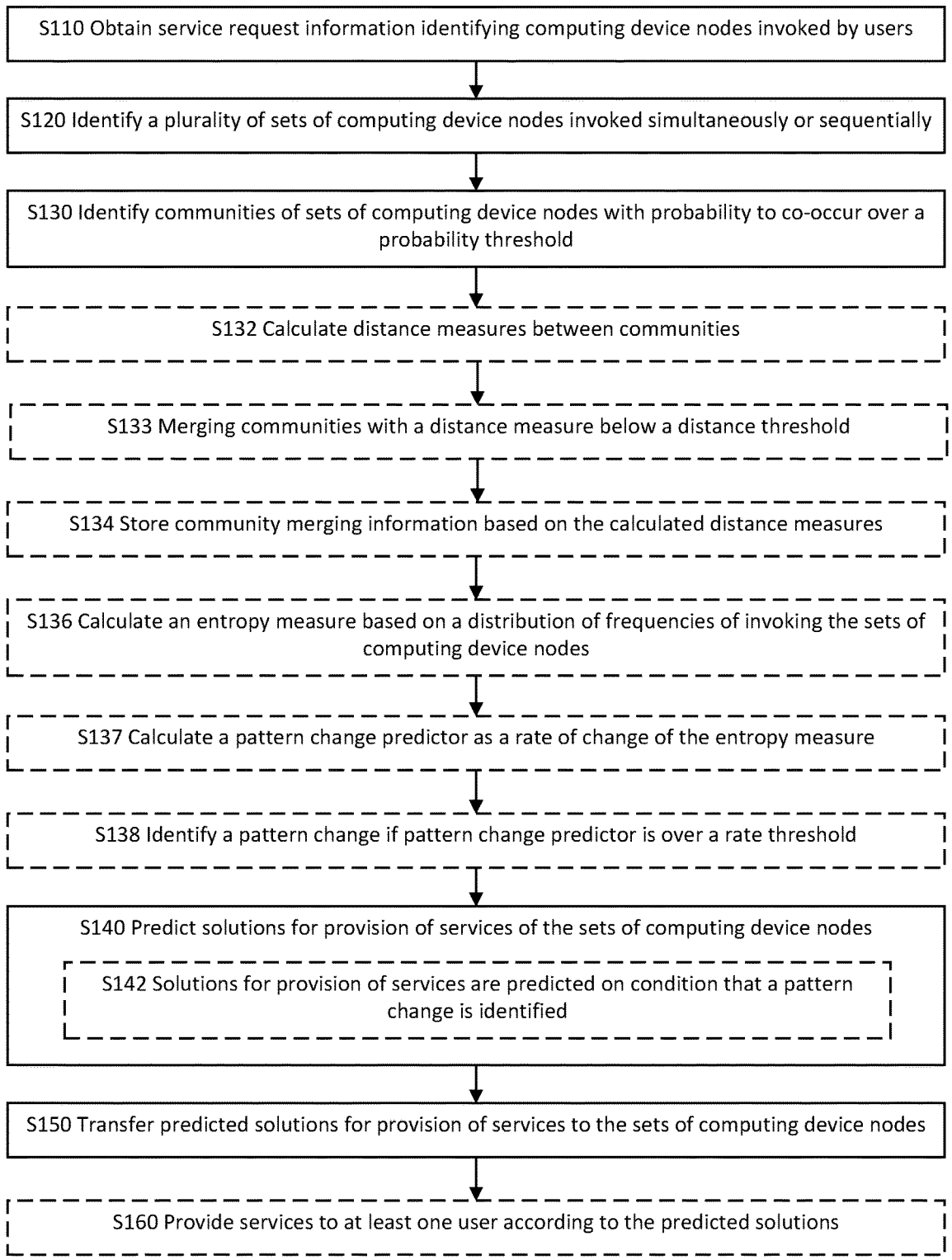
FIG. 1 is a flowchart illustrating embodiments of a method of the present disclosure.

Aspects of the present disclosure will be described more fully hereinafter with reference to the accompanying drawings. The control unit and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The example embodiments presented herein are directed towards enhancing service provision in a network comprising a plurality of computing device nodes for providing services to a plurality of users. As part of the development of the example embodiments presented herein, a problem will first be identified and discussed.

Introduction of an increased number of intelligent and connected devices together with an increase number of local service nodes, there is increasing requirement for local computational resources. Content and data may be transmitted over a 5G network or other wireless or wired network, while intelligence may be enabled close to the user experience through mobile edge computing using edge or fog nodes by means of a fog networking for local computational resources.

In relation to such fog networking, prior art deficiencies may arise in relation requirements for a combination of low latency and location awareness, wide-spread geographical distribution, mobility, dense presence of nodes, predominant role of wireless access, strong presence of streaming and real-time applications, and heterogeneity.

The present disclosure presents solutions that leverage the knowledge distributed across different fog networks that can be crucial to make decisions synergistically for the benefit of communities, and incorporate the knowledge learnt from different communities and aggregated information. Local computation resources are combined with sharing of knowledge between network nodes by means of identification of patterns of user behavior in terms of network resources invoked.

The paradigm of fog computing boosts the connectivity and user benefits exhibited within the network of connected objects. It exceeds the traditional paradigm by bringing enhanced intelligence and context-awareness near to the objects. This implies a huge amount of heterogeneity hidden in the computing and communication processes involved in decision making and smart service provisioning. In the present disclosure users' situational needs, preferences, and other social aspects along with users' surrounding environment are taken into account by identification of patterns of service invocation of the users for enhanced service provision from smart communities.

In the fog based paradigm, devices and objects from connected communities make autonomous and proactive interactions with other communities and things to generate personalized user experience and meet cross-applications' demands. The intelligence needed to cluster objects, services and people increases the quantity and the variety of contextual data that must be handled for provision of services to meet users' needs.

The contextual data may be divided in two types—objective and subjective context. The objective context represents the physical aspects of the user's surrounding environment including location, time, device status, available services, etc. Whereas the subjective context represents the human and social factors including short-term goals, preferences, relationships, trusted services, etc. In the present disclosure, a combination of both is utilized to build the intelligent cognitive reasoning for characterizing users' situations and thus adaptively making the services available from community by managing heterogeneity.

In the present disclosure an adaptive service discovery framework in smart connected community based on temporal and social structure combining users, objects and services is proposed. To realize the cognitive reasoning, contextual data are first represented in hypergraph. Then users' situations are sensed by situation identification and situational goal detection. Matching the situational needs with available community services that could meet these goals is finally performed in a spatiotemporal social structure.

This community structure may be represented by hypergraphs where computing device nodes, such as fog service nodes, of connected things or smart services, can establish relationships with other things in an autonomous way while considering the context awareness, privacy and preferential constraints. Hypergraphs are generalization of graphs in which an edge can connect any number of vertices (nodes). Each hyperedge may contain multiple vertices unlike normal graph where each edge contains two vertices.

FIG. 1 is a flowchart illustrating embodiments of a method 100 in in a network comprising a plurality of computing device nodes for providing services to a plurality of users. A computing device node may be a fog service node, which in addition to computing generally also includes resources for storing and networking. The network generally has a network architecture including a layered structure, for example according to the layered structured illustrated in FIG. 4.

The method 100 illustrated in FIG. 1 comprises obtaining S110 service request information identifying computing device nodes invoked by the plurality of users.

Based on the service request information, a plurality of sets of computing device nodes is identified S120. Each set of computing device nodes comprises computing device nodes invoked simultaneously or sequentially by one of the plurality of users.

By identification of sets computing device nodes invoked simultaneously or sequentially by one of the plurality of users, patterns of computing device node invocation can be determined.

A set of computing device nodes can be logically mapped together in the form of a hyperedge of a hypergraph. Each vertex of a hyperedge represents a computing device node, such as a fog service node, providing service to end users and hyperedges are formed based on computing device nodes that are invoked by users. Specifically, a hyperedge may be a set of computing device nodes that a user invokes together or sequentially. A computing device node can be part of various such hyperedges as various users can invoke service from a computing device node.

A hypergraph may for example be generated in a hypergraph generation block according to the following algorithm for hypergraph generation. Input is the service request information which identifies which of the plurality of users has invoked which computing device node and when. Output is a generated hypergraph of computing device nodes, where each hyperedge of the hypergraph is a set of computing device nodes.

1. Users interested in some specific services and invokes corresponding computing device nodes s, such as fog service nodes, from the computing nodes pool S.

$$\{s_1, s_2, \ldots, s_n\} \subset S$$

For example, a smart vehicle client is interested in weather, fuel station and traffic based services.

2. The interests of various end users diverge to create several small hyperedges with respect to their contexts. From the entire computing service pool, various services can be used or consumed via exploratory activities.

$$e_{A1}: \{s_1, s_3, s_4\}, e_{A2}: \{s_2, s_4\}, e_{B1}: \{s_1, s_4\}.$$

3. After exploring services, consumers may come to more regularly selected services and a new hyperedge is formed corresponding to a new context in the environment that biases consumers' patterned actions.

For example, a smart vehicle can keep on exploring roadside fog services and quickly settles down to some specific fog service nodes to get service along its regular driving pathway.

4. Hyperedges can be united to produce a derived edge E when users have invoked the same set of computing device nodes simultaneously or sequentially. For example, a user A for which there is a hyperedge $e_{A1}$ of a specific set of computing device nodes relating that the user A has invoked, this hyperedge $e_{A1}$ may be united with a hyperedge $e_{B1}$ relating to another user B interested in same services and hence having invoked the same computing device nodes simultaneously or sequentially.

$$E = \{e_{A1} \cap e_{B1}\}$$

For example, a new hyperedge is formed by uniting when a group of smart vehicles are settled for some specific services along the same pathway.

5. A plurality of hyperedges and their vertices are returned. Each vertex corresponds to a computing device node and each hyperedge correspond to a set of vertices, i.e. a set of computing device nodes.

Additionally, a new hyperedge formed due to some new context, may instead of united with a hyperedge having the same set of computing device nodes, be united with a closest hyperedge. The measure of closeness is defined by the co-occurrence of invoked computing device nodes in each hyperedge. For example, if a new hyperedge is $E_{new}$ and existing hyperedges are $\{E_1, E_2, \ldots, E_M\}$, then:

```
for i in {1: M} do
    if E_new ∩ E_i = E_new then
        remove E_new
    end if
end for
```

Hence, the new hyperedge will be fused with another hyperedge if the other hyperedge includes at least all of the set of computing device nodes of the new hyperedge. The other hyperedge may include further computing device nodes.

Communities are then identified 130 based on a probability measure that is a measure of a probability of co-occurrence of two sets of computing device nodes. Each community consists of sets of computing device nodes each having the probability measure over a probability threshold in relation to at least one other set of computing device nodes in the community. The probability threshold may be set in view of the probability measure used and specific design considerations.

A community may for example be generated in a community detector block according to the following. A community is generated by connecting hyperedges, i.e. sets of computing device nodes, co-occurring frequently with each other, where the co-occurrence of invocation of services from two hyperedges, such as an $edge_a$ and an $edge_b$, is computed as the pointwise mutual information. If E is the set of all hyperedges,

```
a_community := [ edge_a ]
i := 0
for edge_a in E do:
    for edge_b in (E − edge_a) do:
```

$$P_{community(a,b)} = \frac{P(edge_a, edge_b)}{P(edge_a) P(edge_b)}$$

```
        if P_community(a,b) > probability threshold θ then:
            a_community[++i] = P_community(a,b)
        end if
    end for
end for
```

The higher the probability measure $P_{community(a,b)}$ is, the higher is the chance of merging two edges $edge_a$ and $edge_b$ into same community depending on the configuration of the probability threshold θ.

Identification of communities enables knowledge sharing in relation to users for which knowledge sharing is more likely relevant.

Solutions for provision of services of the sets of computing device nodes of the communities are then predicted S140. Each predicted solution for provision of services relates to a community and is determined based on shared knowledge of predicted solutions for provision of services relating to other communities. The predicted solutions for provision of services are transmitted S150 to the sets of computing device nodes of the communities.

Solutions for provision of services of the sets of computing device nodes of the communities may be predicted in a perpetual predictor block (predictor) in combination with a combiner block (combiner) according to the following.

The perpetual predictor and the combiner are two blocks that work together. The predictor block is machine learning based and resides at one or some community nodes to predict the best possible solution for service provision for the end users based on the knowledge available from the community in which the predictor resides. The combiner combines the shared knowledge from other predictors of other communities and transforming that to its own predictor in the same community for learning and predicting. Thus, they deploy an overall clustered model distributed across the system.

Predictors perpetually learn from the new incidents in environment and extend their experience so that others can effectively use their prior knowledge. Predictors aim to remember what they have learned and what other predictors have learned with clustered system using both asynchronization and synchronization learning. The goal is to sequentially store learned knowledge and to selectively transfer that knowledge when a predictor learns some new task, so as to develop more accurate hypotheses or policies.

This sets up a clustered learning process to combine individual learning models in the different communities into the shared model in the overall system including all communities. The combiner combines private knowledge in the own community into the shared learning to other communities, and then evolves the shared learning.

In the learning phase, the training environment is dynamic. State of actors are uncountable with new environments and situations appearing continuously. In different predictors, the structure of hidden layers of the policy network can be different. The combiner fuses training results. The predictors are trained in new situations based on the shared knowledge. This system is more suitable where the environment is uncountable, especially in the perpetual learning framework. The procedures of training, predicting, knowledge sharing, combining and knowledge transferring are given below:

In Markov decision process (MDP), a compact state set is defined as S and a finite action set as A. A policy is a mapping that outputs for each state-action pair (s; a). The state-action function is the expected return for a state action pair under a given policy. Reinforcement learning solves an MDP usually by finding an optimal policy that maximizes the expected return. Q-learning is an important model-free and off-policy learning algorithm in reinforcement learning. If both S and A are finite sets, the Q-value function can be easily represented by an |S|×|A| matrix.

For transferring the knowledge, as mentioned above, a standard reinforcement learning based predictor takes input the shared knowledge and returns a solution in a possible set of solutions. There will be a knowledge space for reinforcement learning and hypotheses space (possible solutions, e.g., policies and value functions). Knowledge space refers to all the necessary input information for computing a solution of a task such as samples, features and learning rate.

A predictor contains its private strategy model (knowledge) through reinforcement learning in its environment and sends it to its combiner. The strategy model provides information regarding best possible solutions for service provision. The combiner uploads the same to its hyperedge for knowledge sharing.

If a predictor needs to learn by reinforcement learning from another environment relating to another community with another predictor and other combiner, its combiner gets the knowledge (strategy model) shared by the other combiner of the other community and sends the knowledge (strategy mode) to the predictor. The predictor utilizes it as the initial actor model from the other predictor in reinforcement learning.

The other predictor can get its private strategy model updated by reinforcement learning in its environment relating to its own community. Once the training is finished, it also shares its knowledge to its combiner, i.e. the other combiner, which combines the initially received knowledge by the other combiner and newly learned knowledge by its predictor and makes it available in the hyperedge as a shared knowledge.

In the future, the evolved shared knowledge can be used by other predictors. Those predictors will also upload their private strategy models to promote the evolution of the shared model.

The real-life learning environment is extremely dynamic and hence perpetual learning is required for the predictors. Locally predictors learn to handle the new situations and combiners combines the obtained knowledge. Each time a shared model is generated, it makes an evolution in perpetual learning.

Knowledge sharing, and combing may performed at a predefined frequency so that shared knowledge is always updated based on dynamic nature of the environment.

Specifically, an algorithm for knowledge sharing and combining according to the following may be used. Input to the algorithm is $W_i$=Parameters of $i^{th}$ shared model. Output from the algorithm is the evolved model $W_i'$:

1. Combiner shares $W_i$ to the hyperedge
2. for j := 1 to m do
   a. $W_j$ ← Predictor j performs reinforcement learning with π policy;
   b. send $W_j$ to combiner j;
  end
3. Generate $W_i$+1 = combine ($W_1, W_2, ..., W_m, W_i$)
4. $W_i$ ← $W_i$+1

In the foregoing machine learning by means of reinforcement learning is used as an example without loss of generality of type of method possible to use for prediction.

In some embodiments, the method further comprises calculating S136 an entropy measure based on a distribution of frequencies of invoking the sets of computing device nodes. The entropy measure is higher if the frequencies are unevenly distributed and lower if the frequencies are evenly distributed. Furthermore, a pattern change predictor is calculated S137 as a rate of change of the entropy measure, a pattern change is identified S138 on condition that the pattern change predictor is over a rate threshold. The rate threshold may be set in view of the entropy measure used and specific design considerations.

The use of an entropy measure in a network system is a scalable technique to detect unexpected behaviors and abrupt changes. Here entropy calculated in an entropy detector block and is used in as a quantitative index for evaluating structural changes based on hyperedges obtained in the hypergraph. The change in users' behavior in context specific computing device node invocation leads to change in entropy. Hence entropy would be used in identifying changes in the network. Entropy may be defined as:

$$F_g = -\sum_i P(E_i)\log(P(E_i))$$

where $$P(E_i) = \frac{freq(E_i)}{\sum_i freq(E_i)}$$

Here, freq($E_i$) denotes a frequency of invoking the set of computing device nodes of a hyperedge $E_i$.

The pattern change by entropy is calculated in a pattern change predictor block as:

$$PC_{Entropy} = \max\left(\frac{d(F_g)}{dt}, 0\right)$$

A larger positive value of $PC_{Entropy}$ means high changes in the pattern of invoking of computing device nodes in the network. $PC_{Entropy}$ is regarded as the change-point score obtained from entropy, for time t. That is, $PC_{Entropy}$ is an index of the structural change of invocation of computing device nodes in the network. A rate threshold $t_{PC}$ is defined to decide if a pattern change is significant or not, or in other words if a pattern change is identified. For $PC_{Entropy}$ equal to or below the rate threshold $t_{PC}$, the pattern change is not considered significant and is not identified. The rate threshold may be set in view of the entropy measure used and specific design considerations.

In some embodiments, the solutions for provision of services are predicted S142 on condition that a pattern change is identified.

In some embodiments, the method further comprises calculating S132 distance measures between communities. The distance measures are inversely dependent of a number of cross community service requests and the total number of users participating in cross provisional community service requests. Communities with a distance measure below a distance threshold are then merged S133, and community merging information identifying merged communities for use in cross community service invocation is stored S134. The distance threshold may be set in view of the distance measure used and specific design considerations.

The distance measure may be calculated in a community merger block. This system works like a hierarchical community merger. It keeps on merging the communities until it gets a single, whole community. The information of the whole community is stored at the global layer in a cloud server. The community merger calculates the distance between two communities according to following formula:

$$\text{distance} = \frac{1}{\frac{\text{no. of cross community service requests}}{\text{total numbers participated in cross community requests}}}$$

The information of merged communities is stored at the global layer in a cloud server so that cross community service request can be addressed with minimum latency.

In some embodiments, the method further comprising providing S160, to at least one user of the plurality of users, services of at least one set of computing device nodes of the communities according to the predicted solutions for provision of services.

Figure 2:
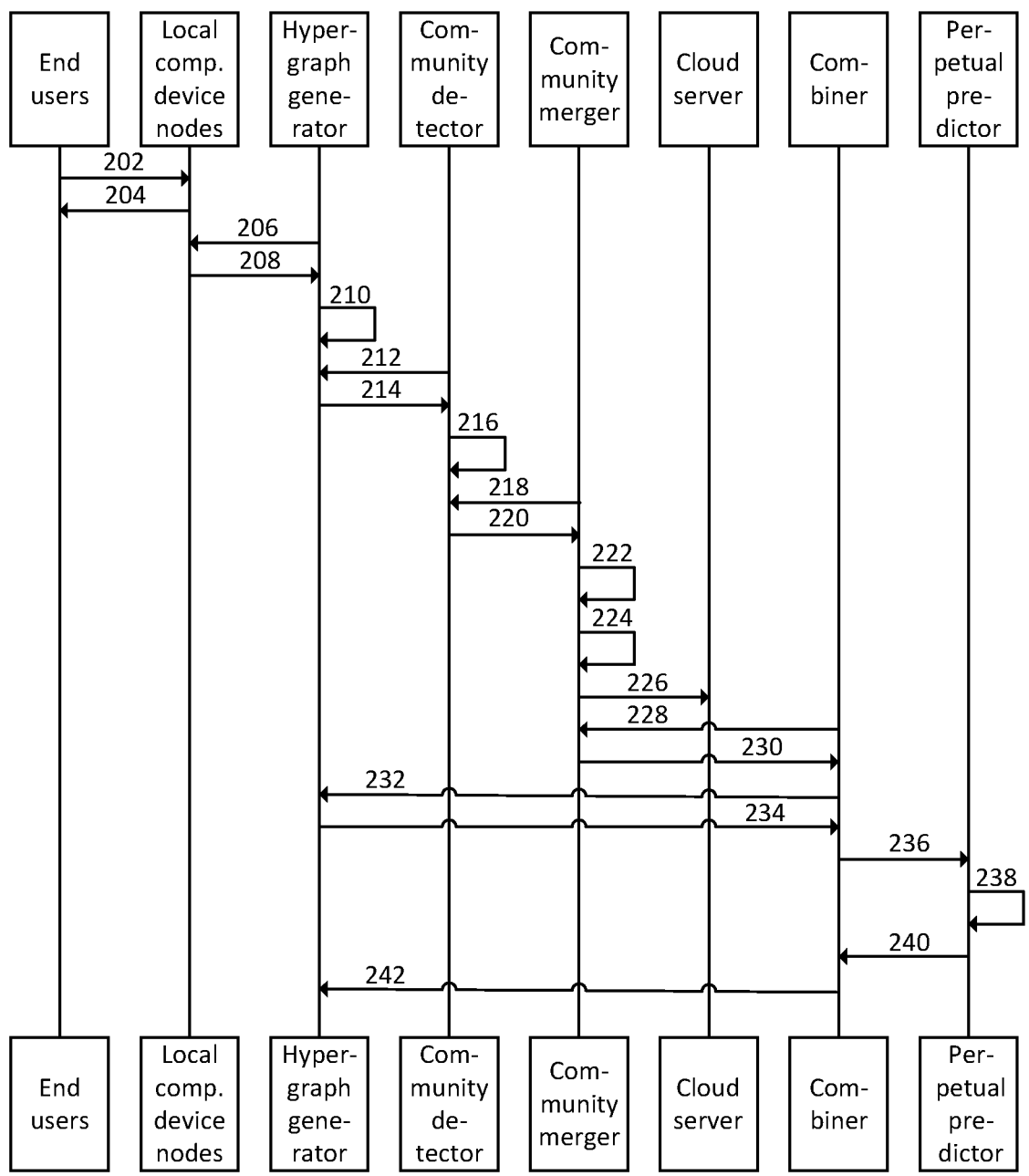
FIG. 2 is a signalling diagram illustrating an exchange of signals in relation to embodiments of the present disclosure.

FIG. 2 is a signalling diagram illustrating an exchange of signals in relation to embodiments of the present disclosure. The signaling diagram illustrates the signaling sequence in a training phase. A plurality of end users invokes local computing device nodes by sending 202 service requests. The local computing device nodes sends 204 service responses in reply to the service requests. A hypergraph generator requests 206 service request information identifying computing device nodes invoked by the plurality of end users from the local computing device nodes and receives 208 the service request information identifying computing device nodes invoked by the plurality of end users from the local computing device nodes. Based on the service request information, a hypergraph comprising a plurality of hyperedges is identified 210 e.g. according to the description in relation to FIG. 1. Each hyperedge has a set of computing device nodes comprising computing device nodes invoked simultaneously or sequentially by one of the plurality of users as identified from the service request information. A community detector then request 212 the hypergraph or a subset of the hyperedges for identifying communities, e.g. according to the description in relation to FIG. 1. The hypergraph or the subset of the hyperedges is sent 214 to the community detector, which then identifies 216 communities based on a probability measure that is a measure of a probability of co-occurrence of two hyperedges. A condition for two hyperedges to form a community is that the probability measure for two hyperedges is over a probability threshold. The probability threshold may be set in view of the probability measure used and specific design considerations.

A community merger then requests 218 community information from the community detector. The community information is sent 220 to the community merger which then merges communities based on a distance measure e.g. according to the description in relation to FIG. 1. The community merger calculates 222 the distance measures between communities and merges communities with a distance measure below a distance threshold e.g. according to the description in relation to FIG. 1. The distance threshold may be set in view of the distance measure used and specific design considerations. Community merging information identifying merged communities is stored 224 in the community merger and sent 226 to a cloud server for storing as well. The community merging information is stored for subsequent use in cross community service invocation.

Next, a combiner requests 228 and receives 230 community knowledge from the community merger. The community knowledge includes knowledge from other hyperedges in the community. The combiner further requests 232 and receives 234 hypergraph information from the hypergraph generator. The combiner the sends 236 the community knowledge and hypergraph information with a perpetual predictor. The perpetual predictor then predicts 238 solutions for provision of services of the sets of computing device nodes of the hyperedges of the communities e.g. according to the description in relation to FIG. 1. The predicted solutions are sent 240 to the combiner and the combiner sends 242 the predicted solutions to the hypergraph generator.

Figure 3:
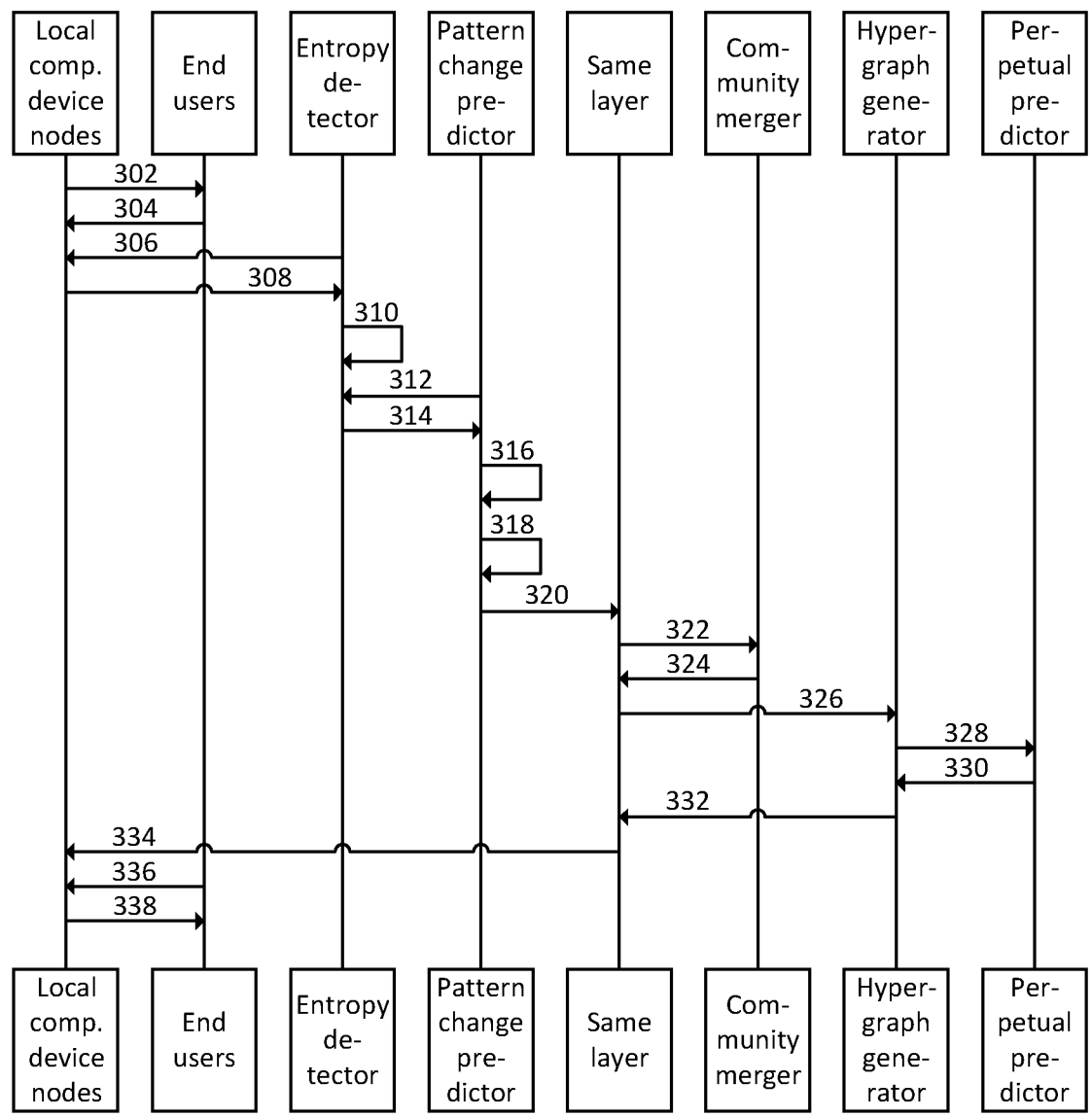
FIG. 3 is a further signalling diagram illustrating an exchange of signals in relation to embodiments of the present disclosure.

FIG. 3 is a further signalling diagram illustrating an exchange of signals in relation to embodiments of the present disclosure. The signaling diagram illustrates the signaling sequence in a relation to an incident. Local computing device nodes, such as a local fog service node, request 302 and receives 304 sensor data from the end users, such as sensor data from IoT sensors, sensors of smart devices etc. An entropy detector then requests 306 and receives 308 service request information identifying computing device nodes invoked by the plurality of end users from the local computing device nodes. The service request information may for example include a frequency of invoking the respective set of computing device nodes of the hyperedges. Based on the service request information, the entropy detector calculates 310 an entropy measure e.g. according to the description in relation to FIG. 1. A pattern change predictor then requests 312 and receives 314 the entropy measure from the entropy detector and calculates 316 a pattern change predictor as a rate of change of the entropy measure, e.g. according to the description in relation to FIG. 1. The pattern change predictor then identifies 318 a pattern change on condition that the pattern change predictor is over a rate threshold. The rate threshold may be set in view of the entropy measure used and specific design considerations. If a pattern change is identified, the pattern change predictor requests 320 knowledge sharing from same layer computing device nodes, such as same layer fog service nodes. A same layer device is a device in the same layer of a hierarchical structure, such as a fog hierarchical structure. The same layer computing device nodes then requests 322 and receives 324 community information from a community merger. The same layer computing device nodes then requests 326 related service information from a hypergraph generator. Related service information are for services that are related. For example, traffic information is related to current weather information and road condition information etc. The hypergraph generator in turn requests 328 and receives 330 a prediction from a perpetual predictor. The prediction relates to solutions for provision of services of the sets of computing device nodes of the communities, e.g. according to the description in relation to FIG. 1. The hypergraph generator then sends 332 the related service information and prediction to the same layer computing device nodes, which in turn cascades relevant knowledge and predicted values 334 to the local computing device nodes. The end users then requests 336 and receives 338 the knowledge including solutions for provision of services.

Figure 4:
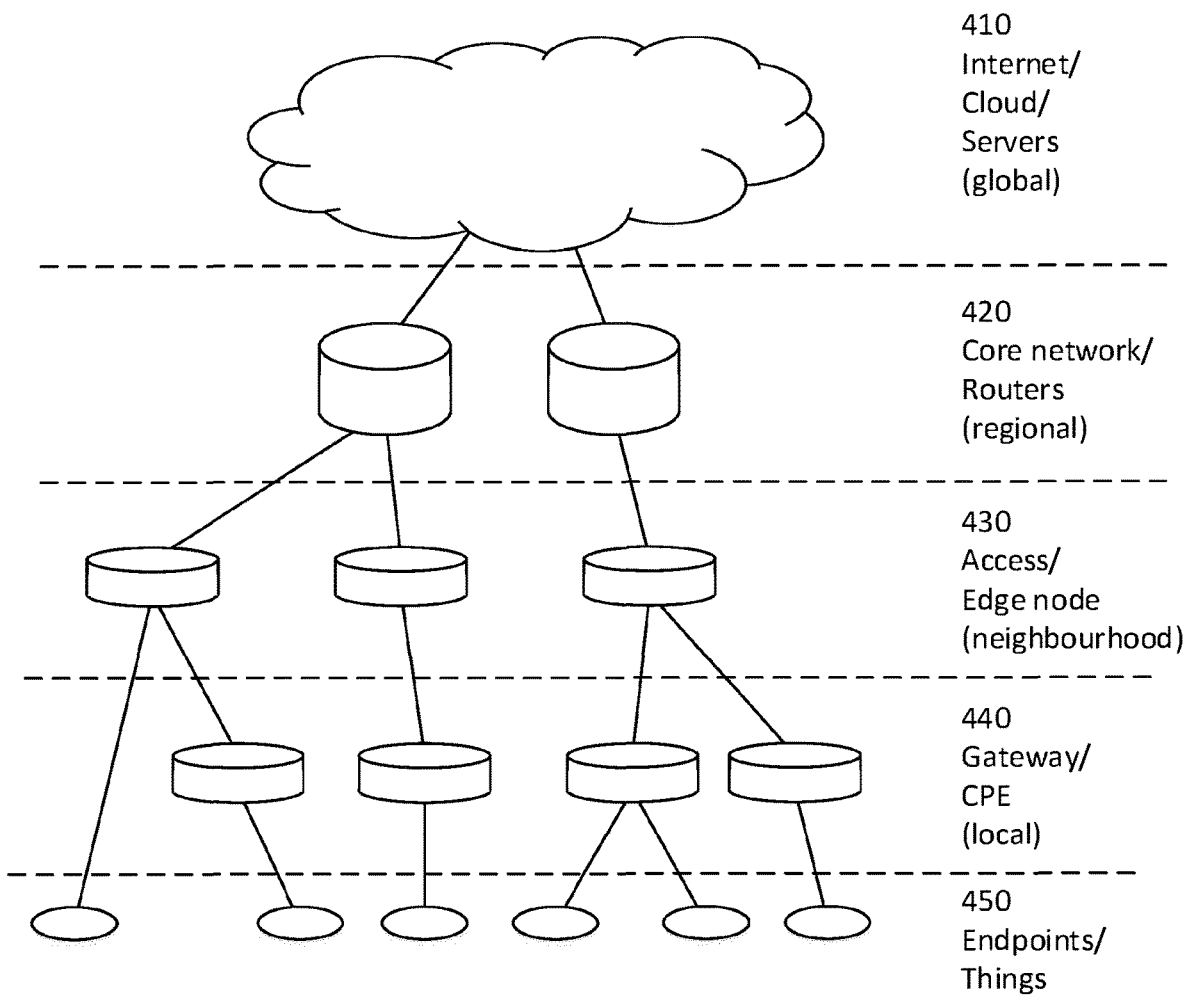
FIG. 4 is a schematic view of a network layer structure in relation to which embodiments of the present disclosure may be practiced.

FIG. 4 is a schematic view of a network layer structure 400 in relation to which embodiments of the present disclosure may be practiced. The network shown in FIG. 4 includes a global layer 410 which includes servers, such as cloud servers connected to the Internet. To the cloud servers, routers of a core network are connected in a regional layer 420.

An overview of how systems and methods of the present disclosure work for the collaboration among smart and connected communities so that vital local, context aware knowledge can be available proactively for the community and community members are benefited is provided in the following.

Step 1: Hypergraph generator blocks are located at local layer 440. During the training phase, it first generates the hypergraph of the computing device nodes based on the service requests pattern from end users.

Step 2: Community detector blocks are located at neighbourhood (city) layer 430. Once the hypergraph is generated, the community detector tries to find out the community of the hyperedges.

Step 3: Community merger blocks are located at zonal, regional and national layers 420 and finally at global (cloud) layer 410. It stores the merging information of the communities based on the distance calculated.

Step 4: Hyperedges contain the sets of computing device nodes which are invoked frequently together (simultaneously or consecutively). Within a community, the service knowledge is distributed at edge network storage unit in a neighbourhood (city) layer 440 and cached temporarily so that community members can get the information proactively before making any decision. Predictors of a community are updated at the predefined frequency based on knowledge shared by other predictors of other communities. They predict the best possible solution for the end users by utilizing the shared information. For example, if community members invoke the service for booking a pool car, the weather information and traffic information from the community would be readily available for the member at edge storage so that pool car booking service can get the current weather and road traffic knowledge to predict the best possible pool car for the destination. Computing device nodes, such as weather and traffic fog service nodes, are community members that made the knowledge available proactively because user shows a pattern in booking pool car in that locality.

The sequence flow in training phase is described hereinabove in relation to FIG. 2.

Step 5: For abrupt situations like traffic block due to accident or sudden change in weather, the calculated entropy in the entropy detector block changes fast due to unexpected behaviors and abrupt changes in invocation of computing device nodes. The high rate of change generates an A high value for $PC_{Entropy}$. If $PC_{Entropy}$ becomes higher than the rate threshold $t_{PC}$, a pattern change is identified (predicted) and the computing device nodes, e.g. the fog service nodes, which are members of the community work together if a pattern change is detected and make the knowledge readily available to each other. The rate threshold may be set in view of the entropy measure used and specific design considerations.

The sequence flow on an incident is described hereinabove in relation to FIG. 3.

It is to be noted that the architecture illustrated in FIG. 4 is only an example. Embodiments of the disclosure can be implemented in other types of architectures having a layered structure with a plurality of fog layers.

Figure 5:
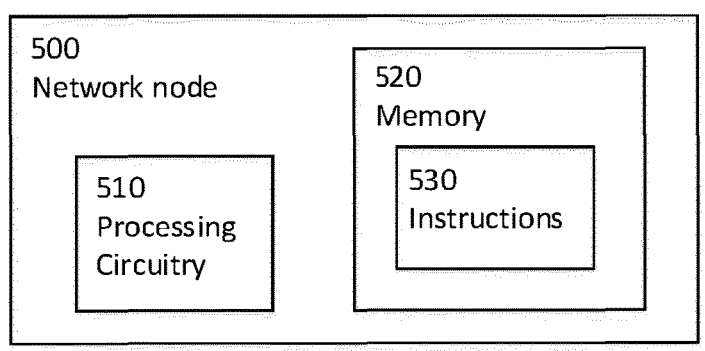
FIG. 5 is a block diagram illustrating further embodiments of a network node of the present disclosure.

FIG. 5 is a block diagram illustrating embodiments of a network node 500, which may incorporate at least some of the example embodiments discussed above. As shown in FIG. 5, the network node 500 comprises processing circuitry 510. The processing circuitry 510 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

The network node 500 further comprises at least one memory unit or circuitry 520 in communication with the processing circuitry 510. The memory 520 is configured to store executable program instructions 530. The memory 520 may be any suitable type of computer readable memory and may be of volatile and/or non-volatile type.

The network node 500 may be included in a communication system. The communication system has a network architecture including a layered structure, for example according to the layered structured illustrated in FIG. 4.

In an embodiment of the network node 500 illustrated in FIG. 5 the memory 520 contains instructions 530 executable by the processing circuitry 510, whereby the embodiment of the network node 500 is operative to identify a plurality of hyperedges of a hypergraph, each hyperedge comprising a respective set of computing device nodes. The plurality hyperedges are identified based on service request information identifying computing device nodes invoked by the plurality of users. Each hyperedge comprises computing device nodes invoked simultaneously or sequentially by one of the plurality of user. The hyperedges may for example be identified as described in relation to FIG. 1.

The network node 500 is further operative to identify communities based on a probability measure that is a measure of a probability of co-occurrence of two hyperedges. A condition for two hyperedges to form a community is that the probability measure for two hyperedges is over a probability threshold. The probability threshold may be set in view of the probability measure used and specific design considerations. The communities may for example be identified according to the description in relation to FIG. 1.

The network node 500 is further operative to receive predicted solutions for provision of services of the sets of computing device nodes of the hyperedges of the communities. Each predicted solution for provision of services relates to a community and is determined based on shared knowledge of predicted solutions for provision of services relating to other communities. The solutions can for example be predicted according to the description in relation to FIG. 1.

The network node is further operative to transfer the predicted solutions for provision of services to the sets of computing device nodes of the hyperedges of the communities.

In some embodiments, the network node 500 is further operative to calculating an entropy measure based on a distribution of frequencies of invoking the sets of computing device nodes of the hyperedges. The entropy measure is higher if the frequencies are unevenly distributed and lower if the frequencies are evenly distributed. The entropy measure may for example be calculated according to the description in relation to FIG. 1. The network node 500 is further operative to calculate a pattern change predictor as a rate of change of the entropy measure, e.g. according to the description in relation to FIG. 1. The network node is then further operative to identify a pattern change on condition that the pattern change predictor is over a rate threshold. The rate threshold may be set in view of the entropy measure used and specific design considerations.

In some embodiments, the predicted solutions for provision of services are received on condition that a pattern change is identified.

Additionally, in a further embodiment of the network node 500 illustrated in FIG. 5 the memory 520 contains instructions 530 executable by the processing circuitry 510, whereby the embodiment of the network node 500 is operative to obtaining identification of a plurality of hyperedges of a hypergraph. Each hyperedge comprises a respective set of computing device nodes. The plurality hyperedges are identified based on service request information identifying computing device nodes invoked by the plurality of users. Each hyperedge comprises computing device nodes invoked simultaneously or sequentially by one of the plurality of user. The hyperedges may for example have be identified as described in relation to FIG. 1.

The further embodiment of the network node is further operative to obtain identification of communities based on a probability measure that is a measure of a probability of co-occurrence of two hyperedges. A condition for two hyperedges to form a community is that the probability measure for two hyperedges is over a probability threshold. The probability threshold may be set in view of the probability measure used and specific design considerations. The communities may for example have be identified according to the description in relation to FIG. 1.

The further embodiment of the network node is further operative to predict solutions for provision of services of the sets of computing device nodes of the hyperedges of the communities. Each predicted solution for provision of services relating to a community and being determined based on shared knowledge of predicted solutions for provision of services relating to other communities. The solutions may for example be predicted according to the description in relation to FIG. 1.

The further embodiment of the network node is further operative to transfer the predicted solutions for provision of services to the sets of computing device nodes of the hyperedges of the communities.

Embodiments may be implemented in a computer program, comprising instructions 530 which, when executed by processing circuitry 510, cause the processing circuitry 510 to perform embodiments of the method of the disclosure.

Embodiments may be implemented in a computer program product 520 having stored thereon a computer program comprising instructions 530 which, when executed by processing circuitry 510, cause the processing circuitry 510 to perform embodiments of the method of the disclosure.

Figure 6:
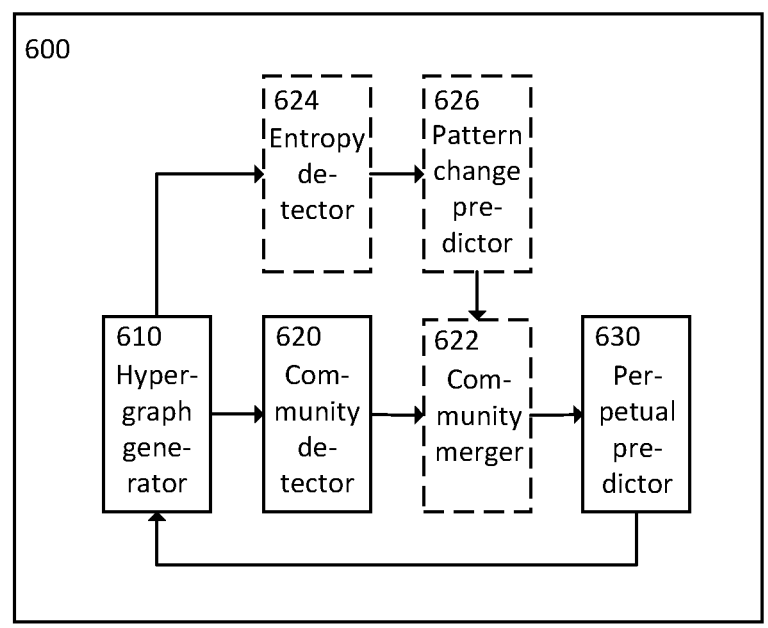
FIG. 6 is a block diagram illustrating embodiments of a system of the present disclosure.

FIG. 6 is a block diagram illustrating embodiments of a system 600 for enhancing service provision in a network comprising a plurality of computing device nodes for providing services to a plurality of users. The system 600 may incorporate the example embodiments discussed above in relation to FIG. 1. The system 600 includes a number of functional blocks, namely a hypergraph generator 610, a community detector 620, and a perpetual predictor 630. Embodiments of the system 600 further comprises a community merger 622, an entropy detector 624, a pattern change predictor 626. The different functional blocks may be implemented in the same physical entity, such as a network node but may alternatively be implemented in different physical entities, such as different network nodes.

The hypergraph generator 610 obtains service request information identifying computing device nodes invoked by the plurality of users from the computing device nodes. Based on the service request information, a hypergraph comprising a plurality of hyperedges is identified, e.g. according to the description in relation to FIG. 1. Each hyperedge has a set of computing device nodes comprising computing device nodes invoked simultaneously or sequentially by one of the plurality of users as identified from the service request information. The community detector 620 then identifies communities based on a probability measure that is a measure of a probability of co-occurrence of two hyperedges. A condition for two hyperedges to form a community is that the probability measure for two hyperedges is over a probability threshold. The probability threshold may be set in view of the probability measure used and specific design considerations. The community detector 620 may for example identify communities according to the description in relation to FIG. 1.

The perpetual predictor 630 then predicts solutions for provision of services of the sets of computing device nodes of the hyperedges of the communities e.g. according to the description in relation to FIG. 1. Each predicted solution for provision of services relates to a community and is determined based on shared knowledge of predicted solutions for provision of services relating to other communities.

The predicted solutions for provision of services are then transferred to the hypergraph generator 610 for further transferring to the sets of computing device nodes of the hyperedges of the communities.

In embodiments of the system 600, the community merger 622 receives community information from the community detector 622. The community merger 622 then merges communities based on a distance measure e.g. according to the description in relation to FIG. 1. The community merger 622 calculates the distance measures between communities and merges communities with a distance measure below a distance threshold. The distance threshold may be set in view of the distance measure used and specific design considerations.

Community merging information identifying merged communities may be stored in the community merger and sent to a cloud server (not shown) for storing as well. The community merging information is stored for subsequent use in cross community service invocation.

In embodiments of the system 600, the entropy detector 624 calculates an entropy measure e.g. according to the description in relation to FIG. 1. The pattern change predictor 626 then receives the entropy measure from the entropy detector and calculates a pattern change predictor as a rate of change of the entropy measure, e.g. according to the description in relation to FIG. 1. The pattern change predictor then identifies a pattern change on condition that the pattern change predictor is over a rate threshold. The rate threshold may be set in view of the entropy measure used and specific design considerations. If a pattern change is identified, a prediction is received in the hypergraph generator 610 from the perpetual predictor 630.

In the following, use case examples in relation to the method, system and network nodes of the present disclosure are provided.

Smart Transport System in SCC

Mobility options continue to expand with the growing Transportation Network Services and autonomous, connected vehicle. The system needs crucial real-time information about the status of the transportation system and other infrastructure and the ability to share it through fog-based or otherwise connected networks in SCC.

One of the key pillars of smart, connected communities is connectivity, and this can come in many forms in transportation: connecting people to jobs through seamless transportation services, connecting transportation data across modes and service providers, and connecting private and public vehicles both to each other and to transportation and municipal infrastructure (e.g., parking, health care, and education).

The proposed system and method can be efficiently used in SCC for enhanced travel safety, reliability, liveability, low fuel waste, low pollution etc. The system can be used by predicting and controlling travel demand in terms of location and time, effectively managing the traffic density or transit use, predicting and responding to planned and unplanned events (e.g., traffic incidents, work zones, inclement weather, and special events), providing travelers with high-quality traffic and weather information.

From end user's perspective, the system can be used for scheduling optimal travel time, predicting best route (unlike real time detection of best route like in Google Map, it uses knowledge and experience-based prediction along with real time data), optimal cab sharing strategy, travel security prediction etc. by utilizing local community based, crowd sourced knowledge. The brief workflow of the system in Smart Transport System is given below:

Local fog layer contains Hypergraph Generator that generates the hypergraph of the computing device nodes based on the service requests pattern from end users in a transport management system. The micro-services can be to provide the services to end users as given above.

Community detector block finds out the community of the hyperedges from similar service request pattern resulting in similar invoked computing device nodes. Community merger blocks stores the merging information of the communities based on the distance measure calculated.

Within a community, the transport micro-services related knowledge is distributed at edge network storage unit and cached temporarily so that community members can get the information proactively before making any decision. Predictors are updated at the predefined frequency based on knowledge shared by other predictors to predict the best possible solution for the end users by utilizing the shared information. For example: if community members invoke the computing device nodes for route and schedule coordination and V2X integration, the weather information, traffic information and unplanned incidents from the community would be readily available for the member at edge storage so that the service can get related knowledge to predict the best possible route and schedule.

E-Health Management in SCC

The proposed system provides a competent and structured approach to handle service deliverance aspects of healthcare in terms of mobile health, remote patient monitoring, patients mobility etc. The system utilizes intelligence at the edge of the network that processes event-based data transmission as well as patient's real-time data stream at Fog Layer. The brief workflow of the system in E-Health Management is given below:

Data acquisition is done by gathering data from patient's wearable devices and community knowledge. Data can be event based as well as stream. A hypergraph generator that generates the hypergraph of the computing device nodes based on the service requests pattern from end users.

Community merger blocks stores the merging information of the different communities work together in e-health management. For example, smart home's patient monitoring system works together with ambulance (vehicle), transport management system, weather fog system, blood bank and hospital communities.

If a patient needs urgent health care, predictors predict the best possible route to move the patient to hospital. The best possible route is measured based on community knowledge shared by transport management system and weather fog. Unplanned incidents are checked. The system also predicts best hospital, availability of bed to get the service for a specific disease and availability of blood in blood bank from the knowledge shared by corresponding communities.

Smart Manufacturing Execution and Maintenance System

Application of IoT in manufacturing industry is now widespread. Due to the very complex process and inherent fluctuations associated with manufacturing process, companies are continually trying to improve their yield rate to reduce costs and increase profit margins.

Predictive maintenance prevents unnecessary repairs, maximizes effective asset lifetime, and significantly reduces major failures and downtime. This results in cost savings with an increased return on investment and customer satisfaction.

Context aware collaboration among fogs communities such as—production fog, maintenance fog, quality assurance fog, waste management fog, transport fog, traffic management fog, weather fog etc. help to solve localization problems like failure detection, downtime prediction, maintenance planning, cost-effective logistics and supply chain planning efficiently.

The embodiments disclosed and illustrated in relation to the drawings, have generally been described in relation to one service category and a limited number of parameters and types of performance degradation. It will be apparent that the embodiments may be extended to several service categories and a variety of parameters and types of performance degradation.

FIG. 1 comprises some operations which are illustrated comprised in solid line boxes and some operations which are illustrated comprised in dashed line boxes. The operations which are comprised in solid line boxes are operations which are comprised in the broadest example embodiment. The operations which are comprised in dashed line boxes are example embodiments which may be comprised in, or a part of, or are further operations which may be taken in addition to the operations of the broader example embodiment. It should be appreciated that these operations need not be performed in any specific order unless otherwise specified, and that not all of the operations need to be performed. The example operations may be performed in any order and in any combination unless otherwise specified.

Similarly, FIG. 6 comprises some functional blocks which are illustrated as solid line boxes and some functional blocks which are illustrated as dashed line boxes. The functional blocks which are illustrated as solid line boxes are functional blocks which are comprised in the broadest example embodiment. The functional blocks which are illustrated as dashed line boxes are example embodiments which may be comprised in, or a part of, or are further functional blocks which may be taken in addition to the functional blocks of the broader example embodiment.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for enhancing service provision in a network comprising a plurality of computing device nodes for providing services to at least one user of a plurality of users, the method comprising:
   obtaining service request information identifying computing device nodes of the plurality of computing device nodes invoked by the plurality of users;
   identifying, based on the service request information, a plurality of sets of computing device nodes, each set of computing device nodes comprising computing device nodes of the plurality of computing device nodes invoked simultaneously or sequentially by one of the plurality of users;
   identifying communities based on a probability measure that is a measure of a probability of co-occurrence of two sets of computing device nodes of the plurality of sets, each community of the identified communities has sets of computing device nodes each having the probability measure over a probability threshold in relation to at least one other set of computing device nodes in the community;
   predicting solutions for provision of services of the sets of computing device nodes of the identified communities, each predicted solution for provision of services relating to a community of the identified communities and being determined based on shared knowledge of predicted solutions for provision of services relating to other communities of the identified communities;
   transferring the predicted solutions for provision of services to the sets of computing device nodes of the identified communities; and providing, to at least one user of the plurality of users, services of at least one set of computing device nodes of the identified communities according to the predicted solutions for provision of services.

2. The method of claim 1, further comprising:
calculating an entropy measure based on a distribution of frequencies of invoking the sets of computing device nodes, wherein the entropy measure is higher if the frequencies are unevenly distributed and lower if the frequencies are evenly distributed;
calculating a pattern change predictor as a rate of change of the entropy measure; and
identifying a pattern change on condition that the pattern change predictor is over a rate threshold.

3. The method of claim 2, wherein the solutions for provision of services are predicted based on a pattern change being identified.

4. The method of claim 1, further comprising:
calculating distance measures between the identified communities, each distance measure being inversely dependent of a number of cross community service requests and the total number of users participating in cross provisional community service requests;
merging the identified communities with a distance measure below a distance threshold; and
store community merging information identifying merged communities for use in cross community service invocation.

5. A system for enhancing service provision in a network comprising a plurality of computing device nodes for providing services to at least one user of a plurality of users, the system adapted to:
obtaining service request information identifying computing device nodes of the plurality of computing device nodes invoked by the plurality of users;
identifying, based on the service request information, a plurality of sets of computing device nodes, each set of computing device nodes comprising computing device nodes invoked simultaneously or sequentially by one of the plurality of users;
identifying communities based on a probability measure that is a measure of a probability of co-occurrence of two sets of computing device nodes of the plurality of sets, each community of the identified communities has sets of computing device nodes each having the probability measure over a probability threshold in relation to at least one other set of computing device nodes in the community;
predicting solutions for provision of services of the sets of computing device nodes of the identified communities, each predicted solution for provision of services relating to a community of the identified communities and being determined based on shared knowledge of predicted solutions for provision of services relating to other communities of the identified communities;
transferring the predicted solutions for provision of services to the sets of computing device nodes of the identified communities; and
providing, to at least one user of the plurality of users, services of at least one set of computing device nodes of the identified communities according to the predicted solutions for provision of services.

6. The system of claim 5, further adapted to:
calculating an entropy measure based on a distribution of frequencies of invoking the sets of computing device nodes, wherein the entropy measure is higher if the frequencies are unevenly distributed and lower if the frequencies are evenly distributed;
calculating a pattern change predictor as a rate of change of the entropy measure; and
identifying a pattern change on condition that the pattern change predictor is over a rate threshold.

7. The system of claim 6, wherein the solutions for provision of services are predicted based on a pattern change being identified.

8. The system of claim 5, further adapted to:
calculating distance measures between the identified communities, each distance measure being inversely dependent of a number of cross community service requests and the total number of users participating in cross provisional community service requests;
merging the identified communities with the distance measure below a merging threshold; and
store community merging information identifying merged communities for use in cross community service invocation.

9. A network node for enhancing service provision in a network comprising a plurality of computing device nodes for providing services to at least one user of a plurality of users, the network node comprising processing circuitry, and a memory, said memory containing instructions executable by said processing circuitry, whereby said network node is operative to:
identifying, based on service request information identifying computing device nodes invoked by the plurality of users, a plurality of sets of computing device nodes, each set of computing device nodes comprising computing device nodes of the plurality of computing device nodes invoked simultaneously or sequentially by one of the plurality of users;
identifying communities based on a probability measure that is a measure of a probability of co-occurrence of two sets of computing device nodes of the plurality of sets, each community of the identified communities has sets of computing device nodes each having the probability measure over a probability threshold in relation to at least one other set of computing device nodes in the community;
receiving predicted solutions for provision of services of the sets of computing device nodes of the identified communities, each predicted solution for provision of services relating to a community of the identified communities and being determined based on shared knowledge of predicted solutions for provision of services relating to other communities of the identified communities;
transferring the predicted solutions for provision of services to the sets of computing device nodes of the identified communities; and
providing, to at least one user of the plurality of users, services of at least one set of computing device nodes of the identified communities according to the predicted solutions for provision of services.

10. The network node of claim 9, further operative to:
calculating an entropy measure based on a distribution of frequencies of invoking the sets of computing device nodes, wherein the entropy measure is higher if the frequencies are unevenly distributed and lower if the frequencies are evenly distributed;
calculating a pattern change predictor as a rate of change of the entropy measure; and
identifying a pattern change on condition that the pattern change predictor is over a rate threshold.

11. The network node of claim 10, wherein the predicted solutions for provision of services are received based on a pattern change being identified.

12. A network node for enhancing service provision in a network comprising a plurality of computing device nodes for providing services to at least one user of a plurality of users, the network node comprising processing circuitry, and a memory, said memory containing instructions executable by said processing circuitry, whereby said network node is operative to:
- obtaining identification of a plurality of sets of computing device nodes, each set of computing device nodes comprising computing device nodes of the plurality of computing device nodes invoked simultaneously or sequentially by at least one of the plurality of users;
- obtaining identification of communities, each community of the identified communities has sets of computing device nodes each having a probability measure over a probability threshold in relation to at least one other set of computing device nodes in the community, wherein the probability measure is a measure of a probability of co-occurrence of two sets of computing device nodes of the plurality of sets;
- predicting a solution for provision of services of the sets of computing device nodes of a community of the identified communities to which the network node is associated, the predicted solution for provision of services being determined based on shared knowledge of predicted solutions for provision of services relating to other communities;
- transferring the predicted solution for provision of services to the sets of computing device nodes of the identified community to which the network node is associated; and
- providing, to at least one user of the plurality of users, services of at least one set of computing device nodes of the identified communities according to the predicted solutions for provision of services.

13. The network node of claim 12, further operative to:
- transferring the predicted solution for provision of services relating to the community to which the network node is associated, for sharing with other communities.

\* \* \* \* \*